United States Patent

Guines

[11] Patent Number: 5,711,209
[45] Date of Patent: Jan. 27, 1998

[54] BARBECUE STOVE

[76] Inventor: James T. Guines, 3 Woodlyn La., Palm Coast, Fla. 32164

[21] Appl. No.: 643,351

[22] Filed: May 6, 1996

[51] Int. Cl.$^6$ .................................................. A47J 37/00
[52] U.S. Cl. ....................... 99/339; 99/340; 99/421 H; 99/421 HH; 99/482; 126/25 R; 126/9 R; 126/41 R
[58] Field of Search ............... 99/339, 340, 419–421 V, 99/444–450, 481, 482; 126/25 R, 9 R, 41 R, 19 R, 9 B; 219/400

[56] References Cited

U.S. PATENT DOCUMENTS

| | | | |
|---|---|---|---|
| 1,837,924 | 12/1931 | Rutherford . | |
| 2,789,877 | 4/1957 | Pfundt | 312/312 |
| 3,841,211 | 10/1974 | Ellis | 99/482 |
| 3,974,760 | 8/1976 | Ellis | 99/482 |
| 4,348,948 | 9/1982 | Allison | 99/339 |
| 4,495,860 | 1/1985 | Hitch et al. | 99/340 |
| 4,554,864 | 11/1985 | Smith et al. | 99/340 |
| 4,643,162 | 2/1987 | Collins | 126/41 R |
| 4,700,618 | 10/1987 | Cox, Jr. | 99/340 |
| 4,702,224 | 10/1987 | Griffith | 99/446 |
| 4,757,756 | 7/1988 | Van Marr | 99/482 |
| 4,823,684 | 4/1989 | Traeger et al. | 99/447 |
| 5,191,831 | 3/1993 | Walden | 99/446 |
| 5,195,423 | 3/1993 | Beller | 99/340 |
| 5,481,964 | 1/1996 | Kitten | 99/339 |
| 5,515,774 | 5/1996 | Swisher et al. | 99/340 |

FOREIGN PATENT DOCUMENTS 867947 2/1953 Germany .

*Primary Examiner*—Timothy F. Simone
*Attorney, Agent, or Firm*—Edward M. Livingston, Esq.

[57] ABSTRACT

A barbecue stove has optionally a grill (27), a cooking lid (26) and/or an open top (4) on a heater section (1). A stove door (15) on a door end (2) of the heater section is sized and shaped for receiving heater means such as wood, coal, charcoal, gas burners or electrical heating elements and select vapor-producing items. A chimney end (3) of the heater section has a barbecue oven (9) into which heat, smoke, oxidation vapors and/or water vapor generated in the heater section are directed for cooking meats and other foods selectively on designedly heat-circulation shelves (10) that are positional selectively. An oven door (23, 24, 25) provides entry to the barbecue oven from a design wall and/or walls. At a front of the heater section, a suspension rack (8) is extended vertically upward from the stove top for suspending pins, rotisseries, and other means for positioning meats and/or other foods above the heater section. Mobility means such as wheels (22) can be attached to bottoms (5) of the stove and the oven. Although intended primarily for outdoor use, this barbecue stove can be used indoors by extending a chimney pipe from an exhaust outlet (11) in a lid (16) of the barbecue oven to an outdoor outlet.

33 Claims, 3 Drawing Sheets

BARBECUE STOVE

BACKGROUND OF THE INVENTION

This invention relates to outdoor stoves and barbecues.

Various outdoor stoves and outdoor barbecues have been devised. None are known, however, to have both stove and barbecue-oven features with the food-preparation versatility, convenience and portability taught by this invention. A barbecue stove differs from a barbecue fireplace invented by the same inventor in a basic way that stoves differ from fireplaces generally. A stove has a container for heater means and for cooking that is separate from a chimney. A fireplace is a place for a heater means and also a place for cooking within the place for the heater means. Both the barbecue stove and the barbecue fireplace taught by this same inventor have a barbecue oven in which food preparation is achieved with heat, smoke and vapors generated by a heater means. The barbecue oven for the barbecue stove is separate or separable from the barbecue oven. For the barbecue fireplace, the heater means is within the barbecue oven and not functional as a separate barbecue stove.

Examples of different but related outdoor barbecues are described in the following patent documents. U.S. Pat. No. 4,643,162, issued to Collins on Feb. 17, 1987, described and was limited to a barbecue smoker housing having an H-shaped gas burner inside of a bottom portion of the housing. U.S. Pat. No. 4,554,864, issued to Smith, et al. on Nov. 26, 1985, taught an electrical cooker on a pedestal with wheels and having an oven above it and a drip channel around it. U.S. Pat. No. 4,495,860, issued to Hitch, et al. on Jan. 29, 1985, described a charcoal-fired cooker comprising a shell having a shelf with cooking racks and a removable dome above a charcoal pan and a water assembly. U.S. Pat. No. 3,974,760, issued to Ellis on Aug. 17, 1976, described an outdoor cooker having a seesaw support for solid fuel at a bottom of a pit-type apparatus. U.S. Pat. No. 2,789,877, issued to Pfundt on Apr. 23, 1957, taugth an edge-angled cabinet in which wood was smoldered ("pyrodized") to smoke fish or other meat. U.S. Pat. No. 3,841,211, issued to Ellis on Oct. 15, 1974, described a pit barbecue with an electrical heating element which caused wood fuel on a bimetal-supported tray or pan above it to smolder. U.S. Pat. No. 1,837,924, issued to Rutherford on Dec. 22, 1931, described a cooker having a housing with a smoke generator in a bottom section.

SUMMARY OF THE INVENTION

In light of growing popularity of outdoor cooking, objects of this invention are to provide a barbecue stove which can be used for stove-top cooking and a wide variety of grilling, roasting, smoking, steaming, heating, marinating and drying of meat and other types of food conveniently and simultaneously as desired.

This invention accomplishes these and other objectives with a barbecue stove having optionally a grill, a cooking lid and/or an open top on a heater section of the barbecue stove. A stove door on a door end of the heater section is sized and shaped for receiving heater means such as wood, coal, charcoal, gas burners or electrical heating elements and select vapor-producing items. A chimney end of the heater section has an oven into which heat, smoke, oxidation vapors and/or water vapor generated in the heater section are directed for cooking meats and other foods selectively on designedly heat-circulation shelves that are positional selectively. An oven door provides entry to the oven from a design wall and/or walls. At a front of the heater section, a rack is extended vertically upward from the front of the stove for suspending pins, rotisseries, and other means for positioning meats and/or other foods above the heater section. Mobility means such as wheels can be attached to bottoms of the stove and the oven. Although intended primarily for outdoor use, this barbecue stove can be used indoors by extending a chimney pipe from a top of the oven to an outdoor outlet.

The above and other objects, features and advantages of the present invention should become even more readily apparent to those skilled in the art upon a reading of the following detailed description in conjunction with the drawings wherein there is shown and described illustrative embodiments of the invention.

BRIEF DESCRIPTION OF DRAWINGS

This invention is described by appended claims in relation to description of a preferred embodiment with reference to the following drawings which are described briefly as follows:

DESCRIPTION OF PREFERRED EMBODIMENT

Figure 1:
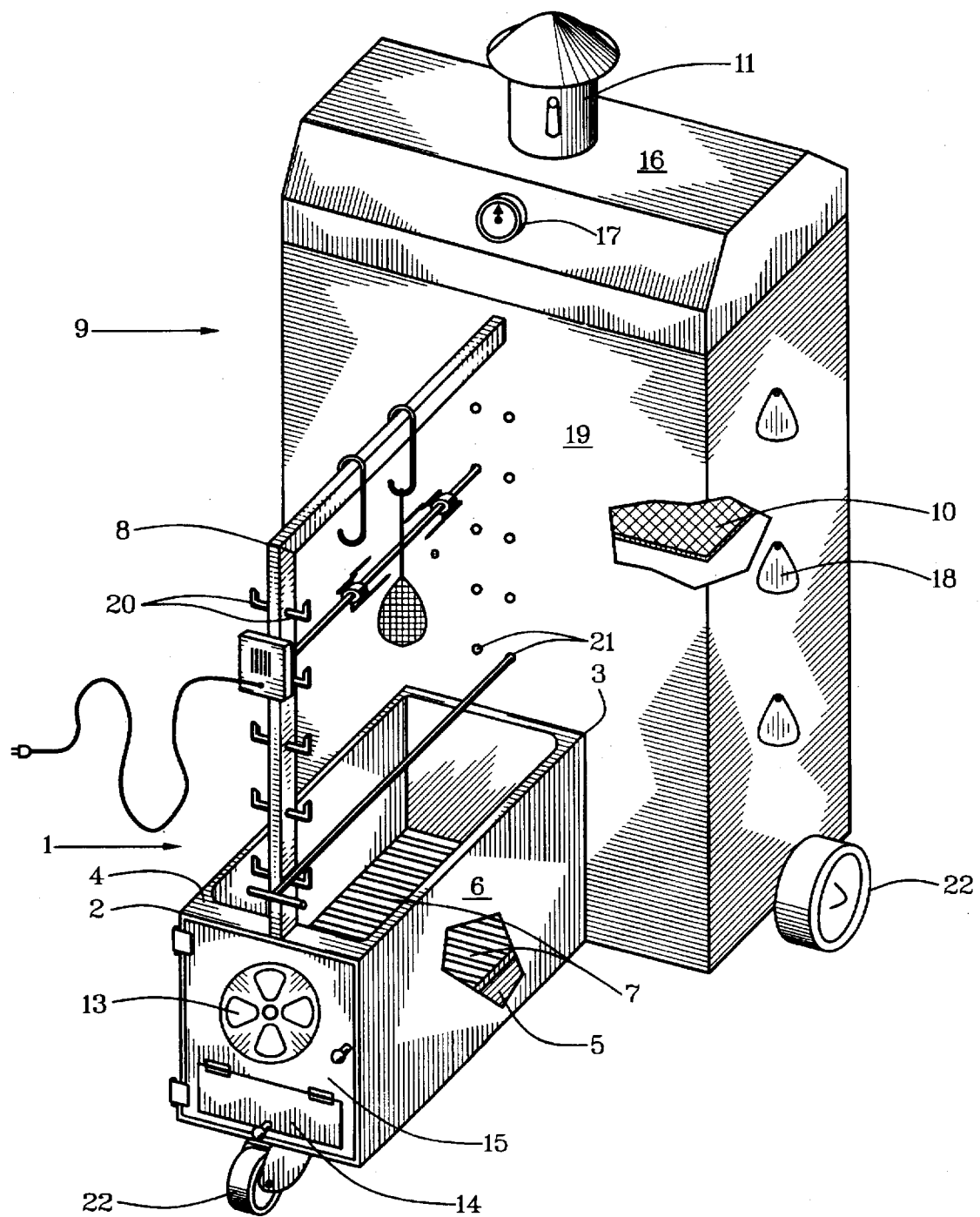
FIG. 1 is a partially cutaway perspective view.
Figure 2:
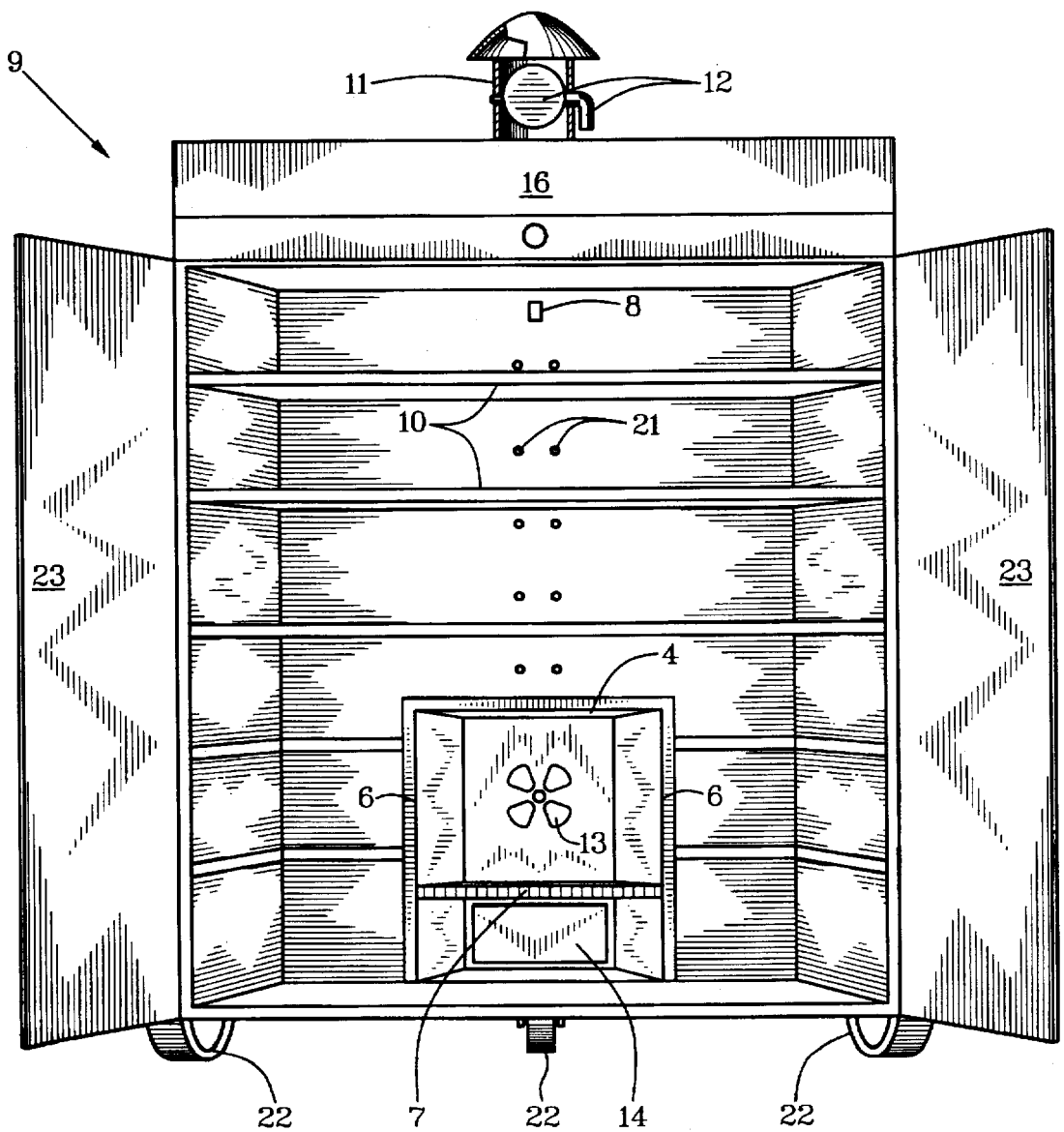
FIG. 2 is a partially cutaway rear view with oven-side doors open.

Reference is made first to FIGS. 1–2. A barbecue stove has a heater section with a door end 2, a chimney end 3, a stove top 4, a stove bottom 5 and stove sides 6. The heater section 1 is sized, shaped and structured to receive select heat-producing means such as wood, coal, charcoal, gas burners and electrical heating elements on a grate 7 inside of the heater section 1. The stove top 4 is sized, shaped and structured to transfer heat vertically upward through select heat-transfer means such as a grill, a stove lid or a food container supported by the stove top 4. The stove top 4 is sized, shaped and structured also to transfer heat directly upward through a stove-top orifice designedly intermediate a door end 2 and a chimney end 3 of the stove top 4 and between opposite stove sides 6. The stove bottom 5 is sized, shaped and structured to support select heat-producing means such as charcoal, gas burners and electrical heating elements beneath the grate 7. The grate 7 is structured also to support vapor-producing items that are heated by heat-producing means such as charcoal, gas burners and electrical heating elements that are positioned beneath the grate 7.

Transfer of heat, smoke and/or vapors directly upward through the stove-top orifice provides food-preparation heat and/or vapors to food suspended from a suspension rack 8 that is positioned vertically above the heater section 1. The suspension rack 8 is sized, shaped and structured to support design food holders such as rotisseries, rods, nets and hooks as depicted or as otherwise foreseeable.

At a chimney end 3 of the heater section 1 is a barbecue oven 9 into which heat, smoke, oxidation vapors, water vapor and other gases generated selectively in the heater section are transferable to the extent that they are not transferred upward selectively through the stove top 4, the stove sides 6 and-or such grill, stove lid, or food container as may be supported by the stove top 4. The barbecue oven 9 is sized, shaped and structured to receive design food holders such as shelves 10, rotisseries, rods, nets and hooks.

At least one exhaust outlet 11 in the barbecue oven 9 has a damper valve 12 that can be operated in combination with an air vent 13 on the door end 2 of the heater section 1. The damper valve 12 can be opened selectively to draw heat and/or vapors from the heater section 1 to the extent that the heat and/or vapors are produced by heater means and not dissipated upward selectively through stove walls and through items on the heater section 1. Amount of heat generated by burning fuel in the heater section 1 can be regulated by mount of air allowed to enter the air vent 13 and by the amount of fuel made available for burning.

Ash from solid fuels such as wood, coal and charcoal falls through the grate 7 to the stove bottom 5 where it can be removed through an ash door 14. The ash door 14 can be used also for insertion of gas burners and electrical heating units to ignite or to heat vapor-producing solid fuels for emission of flavor-generative vapors in combination with heat for preparing food suspended variously from the suspension rack 8 or positioned variously in the barbecue oven 9.

A stove door 15 can be provided to facilitate positioning of heat-producing means and vapor-producing means in the heater section 1. Insertion of solid fuel through the stove door 15 is particularly convenient when hot food and food-preparation items are positioned on or suspended above the stove top 4. The air vent 13 and the ash door 14 can be positioned controllably on the stove door 15.

The exhaust outlet 11 can be positioned on an oven lid 16. Also positioned on the stove, preferably on the oven lid 16, can be a heat gage 17 for indication of oven heat for food preparation in the barbecue oven 9.

The shelves 10 can be any of a variety of conventional shelves that are positional on a variety of conventional shelf-holding means. The shelves 10 and/or the shelf-holding means are porous, net-lie or rod-constructed to allow passage of heat upwardly through and/or around them.

Side vents 18 in the barbecue oven 9 can be provided to draw heat and/or vapor to particular shelf positions. This is accomplished by providing sufficient heat and/or vapor at the heater section 1 and by preventing excessive heat and/or vapor from escaping through the exhaust outlet 11 with the damper valve 12.

Figures 4, 5:
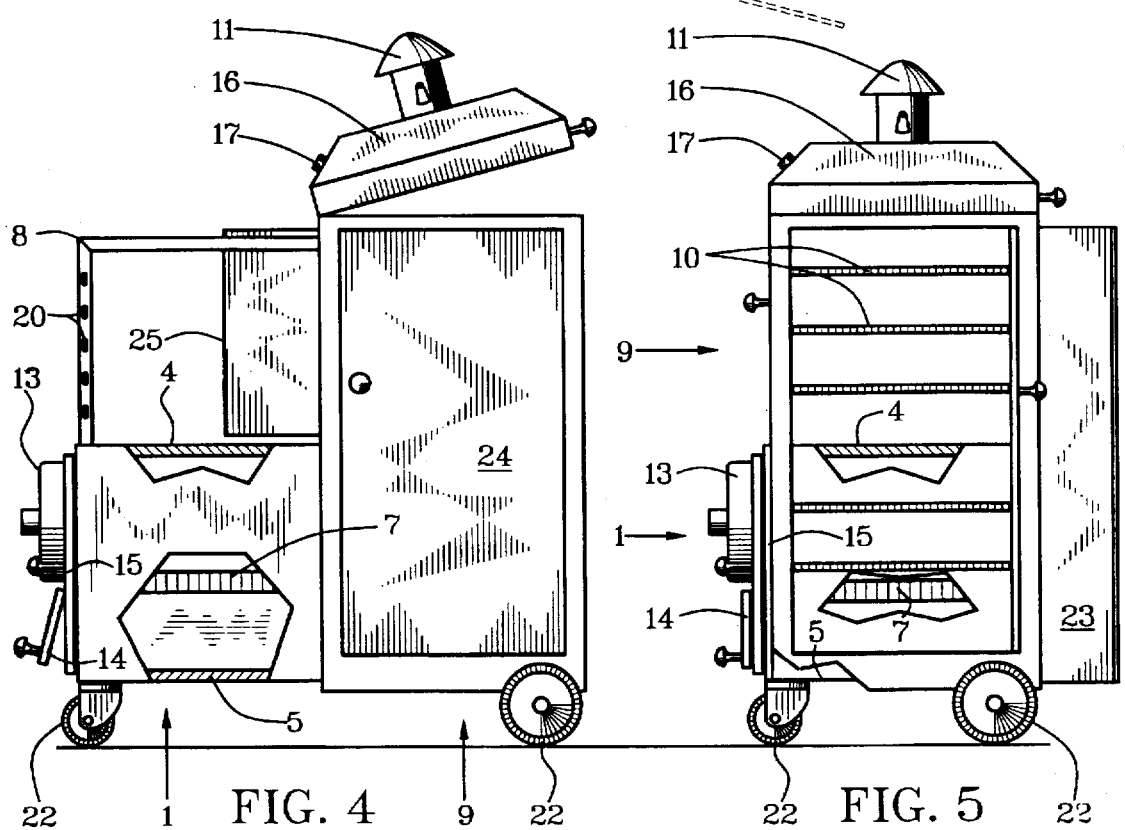
FIG. 4 is a partially cutaway side view of a convertible embodiment in an expanded mode.
FIG. 5 is a partially cutaway side view of the convertible embodiment in a closed mode.

The suspension rack 8 can be extended either vertically upward from the stove top 4 or horizontally outward on a brace member attached to a heater-side wall 19 of the barbecue oven 9. The suspension rack 8 is preferably right-angled with a horizontal oven-supported brace member and a vertical oven-top-supported member. Also, the suspension rack 8 can be made conveniently removable and replaceable for ease of access to the stove and for embodiments of this barbecue stove in which the stove section 1 is slidable into the oven 9 as shown in FIGS. 4-5. On the vertical oven-top-supported member or portion of the suspension rack 8 can be any of a variety of holder appendages 20 onto which can be positioned proximal ends of the design holders such as rotisseries and rods.

On the heater-side wall 19 of the barbecue oven 9 are holder bearings 21 into and/or onto which can be inserted distal ends of design food holders for supporting such items as rotisseries, rods, nets and hooks. The holder bearings 21 can be orifices in the heater-side wall 19 of the barbecue oven 9.

The barbecue stove can be sized, shaped and structured for mobility on design wheels 22 such as the side wheels and caster front wheel illustrated. It can also be constructed in a variety of shapes and sizes for permanent or semi-permanent positioning on design legs or other supports. Although intended primarily for outdoor use, it can be used indoors with suitable chimney hookup to the exhaust outlet 11 and with suitable room-exhaust means. Alternatively also, it can be used indoors beneath a skirted chimney. Preferably, a skin for the skirted chimney would be rectangular to approximate outside dimensions of the barbecue stove and the chimney would have an outlet valve to close when not in use or to close partially as appropriate when being used. It can be an attractive, very useful and highly desirable island stove indoors, outdoors or in a patio. It can be used widely also at public and private camp grounds, parks and beaches.

Figure 3:
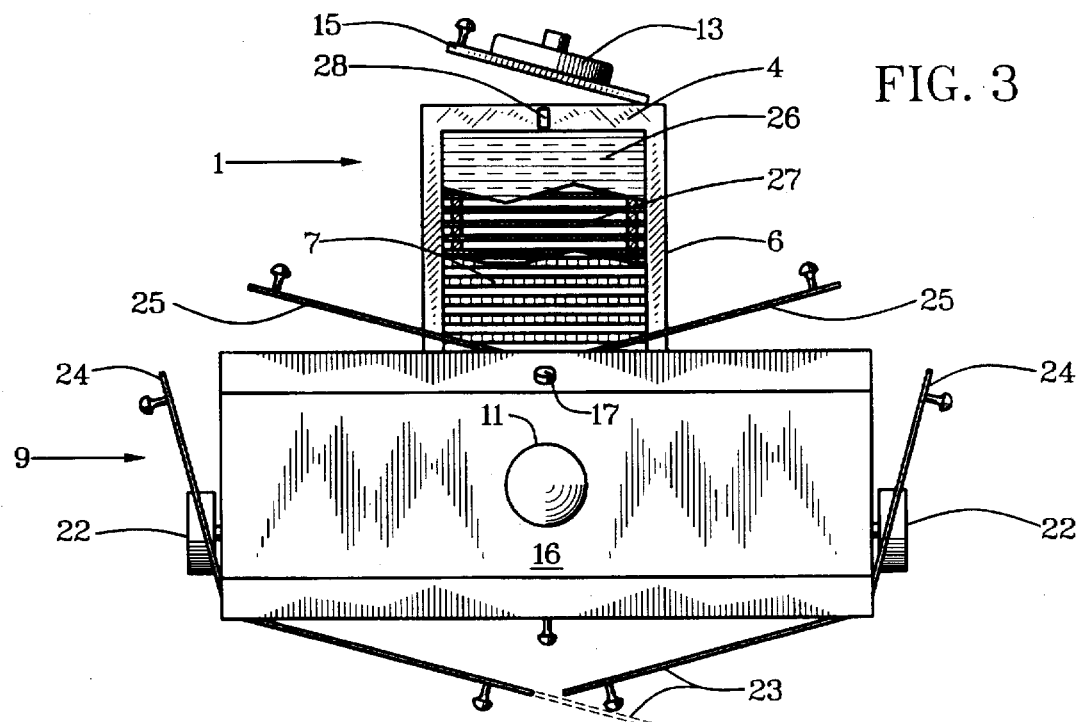
FIG. 3 is a partially cutaway top view.

Referring to FIGS. 2-3, structure of the barbecue oven 9 to receive design food holders such as shelves 10, rotisseries, reds, nets and hooks can include optionally (a) at least one oven-side door 23 on a barbecue-oven-side wall of the barbecue oven 9, (b) at least one lateral-side door 24 on at least one lateral-side wall of the barbecue oven 9, and/or at least one heater-side door 25 on a heater-side wall of the barbecue oven 9 on at least one side of a rack portion of the heater-side wall of the barbecue oven 9. The doors 23-25 can be made to open from either side that is opposite a hinged attachment of each to the barbecue oven 9. Likewise, also, the oven lid 16 can be made to open from either side of the top of the barbecue oven 9.

In FIG. 3, the heater section 1 is depicted being partly covered by a stove lid 26, partly covered by a grill 27 and partly uncovered. At the uncovered portion, the grate 7 is visible from this top drawing. The heater section 1 can be structured for either or all of these options with appropriately structured stove lids 26 and grills 27.

Also in FIG. 3, a suspension rack 8 is omitted for an optional embodiment or use structure. Instead, a rack seat 28 is illustrated for supporting the suspension rack 8 on the stove top 4.

Referring to FIGS. 4-5, a convertible embodiment of this barbecue stove can have a heater section 1 that is in sliding contact with the barbecue oven 9, such that the heater section 1 can be slid inside of the barbecue oven 9 and accessed from at least one door 23, 24 and/or 25 in the barbecue oven 9 for select uses. The suspension rack 8 can be removed or slid inside of the barbecue oven 9 also when the heater section 1 is slid inside of the barbecue oven 9, depending on design preferences. Trade-off factors for sliding the heater section 1 inside of the barbecue oven 9 include (a) less oven space, (b) absence of outside barbecue space over the heater section 1, (c) less floor space, (d) conservation of heat and vapors in a more confined barbecue oven 9, and (e) less convenient access to the heater section for stove-top food preparation.

Sliding contact of the heater section 1 with the barbecue oven 9 can be between two frames as depicted or on a single frame. For a two-frame construction, a caster front wheel 22 would fit into a groove in a bottom of the barbecue oven 9. For a single-frame construction, the caster front wheel 22 would remain in place while the heater section 1 was slid into the barbecue oven 9 on a single flame. A variety of design alternatives are foreseeable for this convertible embodiment.

A new and useful barbecue stove having been described, all such modifications, adaptations, substitutions of equivalents, combinations of parts, pluralities of parts, applications and forms thereof as described by the following claims are included in this invention.

Having thus described my invention, I claim:

1. A barbecue stove comprising:
   a heater section having a door end, a chimney end, a stove top, a stove bottom and stove sides;
   the heater section being sized, shaped and structured to receive select heat-producing;
   a grate that is sized, shaped and structured to support the select heat-producing means and to support vapor-producing items in the heater section;
   the stove top being sized, shaped and structured to transfer heat vertically upward through select heat-transfer means designedly intermediate a door end and a chimney end of the stove top;
   the stove bottom being sized, shaped and structured to support select heat-producing means beneath the grate;
   a barbecue oven into which heat, smoke, oxidation vapors, water vapor and other gases generated selectively in the heater section are transferable at the chimney end of the heater section;
   the barbecue oven being sized, shaped and structured to receive design food holders; and
   at least one exhaust outlet in the barbecue oven.

2. A barbecue stove as described in claim 1 and further comprising:
   a suspension rack positioned vertically above the heater section; and
   the suspension rack being sized, shaped and structured to support design food holders.

3. A barbecue stove as described in claim 2 wherein:
   the suspension rack is extended vertically upward from proximate the door end of the heater section and contains holder appendages onto which can be positioned proximal ends of the design food holders.

4. A barbecue stove as described in claim 3 and further comprising:
   a brace member extended intermediate a top portion of the suspension rack and a heater side wall of the barbecue oven.

5. A barbecue stove as described in claim 3 wherein:
   the heater side wall of the barbecue oven contains holder bearings into which can be inserted distal ends of the design food holders.

6. A barbecue stove as described in claim 2 wherein:
   the suspension rack is extended horizontally from the heater side wall of the barbecue oven and vertically downward at a position proximate the door end of the heater section;
   a vertical portion of the suspension rack contains holder appendages onto which can be positioned proximal ends of the design food holders; and
   the heater-side wall of the barbecue oven contains holder bearings into which can be inserted distal ends of the design food holders for supporting rotisseries, rods, nets and hooks.

7. A barbecue stove as described in claim 1 and further comprising:
   a stove door that is sized, shaped and structured for insertion of the select heat-producing means and select vapor-producing items at a door end of the heater section.

8. A barbecue stove as described in claim 1 wherein:
   structure of the barbecue oven to receive design food holders includes at least one oven-side door on a barbecue-oven-side wall of the barbecue oven.

9. A barbecue stove as described in claim 1 wherein:
   structure of the barbecue oven to receive design food holders includes at least one lateral-side door on at least one lateral-side wall of the barbecue oven.

10. A barbecue stove as described in claim 1 wherein:
    structure of the barbecue oven to receive design food holders includes at least one heater-side door on the heater-side wall of the barbecue oven on at least one side of a rack portion of the heater-side wall of the barbecue oven.

11. A barbecue stove as described in claim 1 wherein:
    the heater section has an air inlet with controllable entry of combustion-supportive oxygen into the heater section.

12. A barbecue stove as described in claim 1 wherein:
    the heater section has a grate onto which fuel can be positioned and an ash-removal door.

13. A barbecue stove as described in claim 1 wherein:
    at least one exhaust outlet in the barbecue oven has a damper valve.

14. A barbecue stove as described in claim 1 wherein:
    a plurality of side vents are positioned at design heights in at least one wall of the barbecue oven.

15. A barbecue stove as described in claim 1 wherein:
    a lid of the barbecue oven is hinged to a design wall of the barbecue oven for top access.

16. A barbecue stove as described in claim 1 wherein:
    at least one heat gauge is positioned on at least one design portion of the barbecue oven.

17. A barbecue stove as described in claim 1 wherein:
    the barbecue stove is sized, shaped and structured for mobility on design wheels.

18. A barbecue stove as described in claim 1 wherein:
    the heater section is in sliding contact with the barbecue oven, such that the heater section can be slid inside of the barbecue oven and accessed from at least one door in the barbecue oven for select uses.

19. A barbecue stove as described in claim 1 wherein:
    the heater section has a grate that is sized, shaped and structured to support such items as solid fuel for burning, liquid burners, gas burners, electrical-heater units and vapor-emitter materials; and
    a bottom wall of the heater section is sized, shaped and structured to support design burners for heating smoulder fuel, other vapor-emitter materials and water for steam to provide desired vapors and heat in the barbecue oven.

20. A barbecue stove comprising:
    a heater section having a door end, a chimney end, a stove top, a stove bottom and stove sides;
    the heater section being sized, shaped and structured to receive select heat-producing means and to receive select vapor-producing items
    the stove top being sized, shaped and structured to transfer heat vertically upward through select heat-transfer means designedly intermediate a door end and a chimney end of the stove top;
    an barbecue oven into which heat, smoke, oxidation vapors, water vapor and other gases generated selectively in the heater section are transferable at the chimney end of the heater section;
    the barbecue oven being sized, shaped and structured to receive design food holders;
    at least one exhaust outlet in the barbecue oven;

a suspension rack positioned vertically above the heater section;

the suspension rack being sized, shaped and structured to support design food holders;

the heater section has and air inlet with controllable entry of combustion-supportive oxygen into the heater section;

the heater section has a grate onto which fuel can be positioned and an ash-removal door;

at least one exhaust outlet in the barbecue oven has a damper valve; and a lid of the barbecue oven is hinged to a design wall of the barbecue oven for top access.

21. A barbecue stove as described in claim 20 wherein:

the suspension rack is extended vertically upward from proximate the door end of the heater section and contains holder appendages onto which can be positioned proximal ends of the design food holders.

22. A barbecue stove as described in claim 20 and further comprising:

a brace member extended intermediate a top portion of the suspension rack and a heater side wall of the barbecue oven.

23. A barbecue stove as described in claim 20 wherein:

the heater side wall of the barbecue oven contains holder bearings into which can be inserted distal ends of the design food holders.

24. A barbecue stove as described in claim 20 wherein:

the suspension rack is extended horizontally from the heater side wall of the barbecue oven and vertically downward at a position proximate the door end of the heater section;

a vertical portion of the suspension rack contains holder appendages onto which can be positioned proximal ends of the design food holders, and the heater side wall of the barbecue oven contains holder beatings into which can be inserted distal ends of the design food holders.

25. A barbecue stove as described in claim 20 and further comprising:

a stove door that is sized, shaped and structured for insertion of the select heat-producing means and select vapor-producing items at a door end of the heater section.

26. A barbecue stove as described in claim 20 wherein:

structure of the barbecue oven to receive design food holders includes at least one oven-side door on a barbecue-oven-side wall of the barbecue oven.

27. A barbecue stove as described in claim 20 wherein:

structure of the barbecue oven to receive design food holders includes at least one lateral-side door on at least one lateral-side wall of the barbecue oven.

28. A barbecue stove as described in claim 20 wherein:

structure of the barbecue oven to receive design food holders includes at least one heater-side door on the heater-side wall of the barbecue oven on at least one side of a rack portion of the heater side wall of the barbecue oven.

29. A barbecue stove as described in claim 20 wherein:

a plurality of side vents are positioned at design heights in at least one wall of the barbecue oven.

30. A barbecue stove as described in claim 20 wherein:

at least one heat gauge is positioned on at least one design portion of the barbecue oven.

31. A barbecue stove as described in claim 20 wherein:

the barbecue stove is sized, shaped and structured for mobility on design wheels.

32. A barbecue stove as described in claim 20 wherein:

the heater section is in sliding contact with the barbecue oven, such that the heater section can be slid inside of the barbecue oven and accessed from at least one door in the barbecue oven for select uses.

33. A barbecue stove as described in claim 20 wherein:

the heater section has a grate that is sized, shaped and structured to support such items as solid fuel for burning, liquid burners, gas burners, electrical-heater units and vapor-emitter materials; and a bottom wall of the heater section is sized, shaped and structured to support design burners for heating smoulder fuel, other vapor-emitter materials and water for steam to provide desired vapors and heat in the barbecue oven.

* * * * *